United States Patent [19]
Han

[11] Patent Number: 5,560,989
[45] Date of Patent: Oct. 1, 1996

[54] MULTILAYER INNERSEAL FACING

[75] Inventor: Hak-Rhim Han, Newport, Minn.

[73] Assignee: Minnesota Mining and Manufacturing Company, Saint Paul, Minn.

[21] Appl. No.: 310,844

[22] Filed: Sep. 22, 1994

Related U.S. Application Data

[62] Division of Ser. No. 90,910, Jul. 13, 1993, abandoned, which is a continuation of Ser. No. 894,077, Jun. 5, 1992, abandoned.

[51] Int. Cl.⁶ ......................................... C09J 7/02
[52] U.S. Cl. .................. 428/349; 215/232; 215/250; 215/347; 220/258; 220/265; 220/359; 428/354; 428/483
[58] Field of Search .................. 428/347, 349, 428/483, 354; 215/232, 250, 347; 220/258, 265, 359

[56] References Cited

U.S. PATENT DOCUMENTS

| | | | |
|---|---|---|---|
| 2,620,939 | 12/1952 | Weisgerber | 215/40 |
| 3,317,068 | 5/1967 | Betner | 215/39 |
| 3,963,845 | 6/1976 | Dukess | 428/64 |
| 3,988,185 | 10/1976 | Johnson et al. | 156/69 |
| 4,370,374 | 1/1983 | Raabe et al. | 428/216 |
| 4,381,848 | 5/1983 | Kahn | 229/43 |
| 4,448,345 | 5/1984 | Helms | 215/232 |
| 4,452,842 | 6/1984 | Borges et al. | 428/195 |
| 4,579,240 | 4/1986 | Ou-Yang | 215/230 |
| 4,596,338 | 5/1986 | Yousif | 215/232 |
| 4,636,273 | 1/1987 | Wolfersperger | 220/265 |
| 4,666,052 | 5/1987 | Ou-Yang | 215/230 |
| 4,757,914 | 7/1988 | Roth et al. | 215/232 |
| 4,778,698 | 10/1988 | Ou-Yang | 428/35 |
| 4,934,544 | 6/1990 | Han et al. | 215/232 |
| 4,935,273 | 6/1990 | Ou-Yang | 215/347 |
| 4,960,216 | 10/1990 | Giles et al. | 215/232 |
| 5,004,111 | 4/1991 | McCarthy | 215/232 |
| 5,012,946 | 5/1991 | McCarthy | 220/258 |
| 5,062,569 | 11/1991 | Hekal | 220/359 |
| 5,117,613 | 6/1992 | Pfaffmann | 53/478 |
| 5,265,745 | 11/1993 | Pereyra et al. | 215/232 |
| 5,372,268 | 12/1994 | Han | 215/232 |

FOREIGN PATENT DOCUMENTS 0135431  3/1985  European Pat. Off. ........ B65D 77/20

*Primary Examiner*—Jenna L. Davis
*Attorney, Agent, or Firm*—Gary L. Griswold; Walter N. Kirn; James J. Trussell

[57] ABSTRACT

An innerseal facing construction is disclosed which includes three layers. An induction heatable layer overlies a heat sink layer, which in turn overlies a bonding layer. The bonding layer has several strata of material of progressively higher melting points. The construction provides an innerseal facing that may be used over a broad range of induction power levels to provide progressively stronger bonding between the innerseal facing and the container.

12 Claims, 3 Drawing Sheets

MULTILAYER INNERSEAL FACING

This is a division of application Ser. No. 08/090,910, filed Jul. 13, 1993, which is a continuation of Ser. No. 07/894,077, filed Jun. 5, 1992, both abandoned.

TECHNICAL FIELD

The present invention relates to an innerseal facing for sealing plastic containers.

BACKGROUND ART

Innerseal facings are often used in packaging of such things as foods and medications to seal and secure the opening of a container before a cap is applied. The innerseal facing provides protection from contaminants that may leak through the cap seal, and provides a tamper evident closure for the container.

Conventional innerseal facing materials are exemplified by the Safegard™-100 and Safegard™-75M products commercially available from Minnesota Mining and Manufacturing Company of St. Paul, Minn. The Safegard™-100 product includes an aluminum foil layer coated with a polymeric material. The Safegard™-75M product includes a polyester layer between the foil layer and the polymeric layer. The typical user will cut an appropriately sized innerseal from the facing material and place it into a bottle cap. Next, the cap may be placed upon a plastic bottle that will force the innerseal into intimate contact with the rim of the bottle. When the capped bottles are passed under an induction coil, the aluminum foil will heat up, and transfer heat to the polymeric material. The polymeric material adheres the innerseal to the rim of the container to seal the container. The end user may remove the innerseal from the container rim to gain access to the contents of the bottle.

One problem with traditional innerseal facings has been the wide variation in sealing force associated with the induction sealing process. The heating duration within the induction field is quite short in order to improve throughput, and random process-related variations in heating duration can greatly alter the ultimate bond strength. The range of induction sealing power settings in which acceptable removal forces can be obtained can be relatively narrow. For example, if the container and innerseal are overheated, the polymeric bonding material may be squeezed from the rim area, which results in the aluminum foil bonding directly to the bottle rim. Direct fusing between the aluminum layer and the bottle rim (known as fuse-bonding) is undesirable, in part because it requires a very high removal force to separate the innerseal facing from the container.

Alternate approaches have been proposed to address these and related problems. For example, U.S Pat. No. 5,004,111 to McCarthy shows an innerseal construction with an integral "top" grip tab. The top tab allows the end user to grasp the tab to remove the innerseal facing from the container rim. The sealing layer of this innerseal separates internally to facilitate removal of the innerseal. U.S. Pat. No. 5,012,946 to McCarthy shows an innerseal construction with an integral "edge" grip tab. U.S. Pat. No. 2,620,939 to Weisgerber shows a multiple layer construction for an innerseal for use with glass containers.

SUMMARY OF THE INVENTION

The present invention provides an innerseal facing for sealing over an opening of a polymeric container by an induction heater having multiple power levels. The innerseal facing includes an induction heatable layer having an upper and a lower surface, and a bonding layer bonded adjacent the induction heatable layer and having multiple strata of polymeric material. Each strata has a progressively lower melting point, wherein the stratum having the highest melting point is proximate the induction heatable layer and the stratum having the lowest melting point is presented for contact with and bonding to the container. The application of progressively higher levels of inductive heat progressively melts the strata in order of their increasing melting points to enable bonding to the container. The removal force for removing the innerseal facing from the container generally increases with the number of strata melted by inductive heating.

In the preferred embodiment, the innerseal facing also includes a heat sink layer interposed between and bonded to the induction heatable layer and the bonding layer for regulating heat flow from the induction heatable layer to the bonding layer and for uniformly heating the bonding layer. Also in the preferred embodiment, the bonding layer includes a first stratum having a first melting point, a second stratum having a second melting point lower than the first melting point, and a third stratum having a third melting point lower than the second melting point.

BRIEF DESCRIPTION OF THE DRAWINGS

In the drawings where like numerals refer to like components throughout several views.

DETAILED DESCRIPTION OF AN ILLUSTRATIVE EMBODIMENT

The present invention relates broadly to an innerseal for a container. Although having particular utility in the area of bottle sealing, the present invention may be useful for sealing other containers as well, and thus a container shall be understood to include a bottle, as shown generally in FIG. 5.

Figure 1:
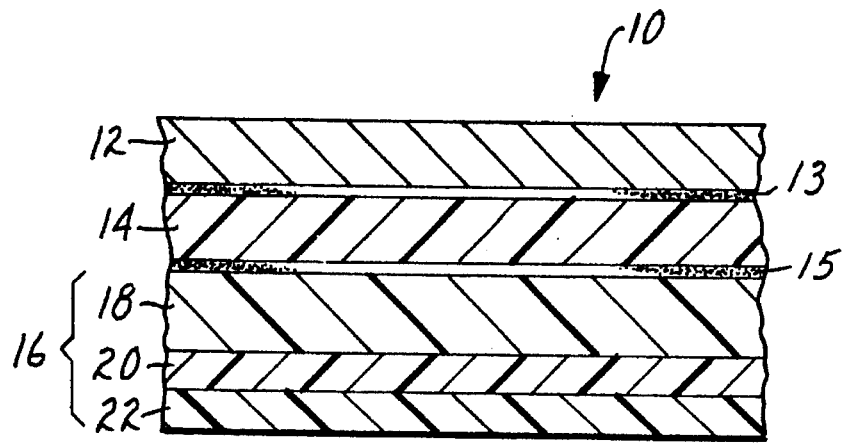
FIG. 1 is a schematic cross-section of a preferred innerseal facing.

FIG. 1 is a schematic cross-section of an innerseal facing 10. In the preferred embodiment, innerseal facing 10 comprises three layers. The induction heatable layer 12 is typically 1 mil aluminum foil, although other metallic foils of different thickness may also have utility. The optional but preferred heat sink layer 14 acts as a heat sink and uniformly distributes heat from induction heatable layer 12 to the bonding layer 16. Heat sink layer 14 also isolates induction heatable layer 12 from the container rim and aids in preventing fuse-bonding. The preferred heat sink layer 14 is a 0.5 mil polyester film, having relatively low thermal conductivity, high strength, and a very high melting temperature (in excess of 200° C., for example). The optimal thickness is believed to be 0.5 mil, although thicknesses of up to approximately two mil may be useful for some applications.

The bonding layer 16 forms the sealing layer and is bonded adjacent induction heatable layer 12, meaning that bonding layer 16 may be bonded directly to induction heatable layer 12, or it may be bonded to heat sink layer 14, which is in turn bonded to induction heatable layer 12. Bonding layer 16 is preferably a polymeric film having at least three co-extruded strata of polymeric material of progressively higher melting points. Hence in the preferred embodiment, innerseal facing 10 comprises three layers (12, 14, and 16), and bonding layer 16 comprises three strata (18, 20, and 22). Within bonding layer 16, the first stratum 18 is placed closest to heat sink layer 14 and has the highest melting point. The second stratum 20 is placed adjacent first stratum 18, and has a melting point that is lower than the melting point of first stratum 18. The third stratum 22 is placed adjacent second stratum 20, and has a melting point that is lower than the melting point of second stratum 20. Third stratum 22 has the lowest melting point and is adapted to contact a container 49, as shown generally in FIG. 5.

In the preferred embodiment, first stratum 18 is a high density polyethylene material preferably with a melting point of approximately 130° C. Second stratum 20 is preferably a low density polyethylene material having a melting point of approximately 104° C. Third stratum 22 is preferably an ionomer having a melting point of approximately 98° C., such as Surlyn™ 1652 which is manufactured by the DuPont Corporation. The relative thickness of each stratum within bonding layer 16 is an important parameter, and in the illustrative embodiment second stratum 20 and third stratum 22 have the same thickness and together represent approximately 24% of the total thickness of the bonding layer 16. A unitary bonding layer 16 of the type described immediately above is presently available as 1.25 mil Zeelon-338 film, which is manufactured by the James River Corporation of Orange, Tex. It should be understood that the materials described with particular reference to bonding layer 16 are intended to be illustrative rather than limiting, and other materials are also contemplated.

The three layers of the preferred innerseal facing 10 may be assembled with adhesive layer 13 and adhesive layer 15. The preferred assembly adhesive is a solvent-based adhesive manufactured by Morton International of Chicago, Ill. and sold as Adcote-503-A. It should be recognized that other assembly materials and techniques may be substituted.

Figure 2:
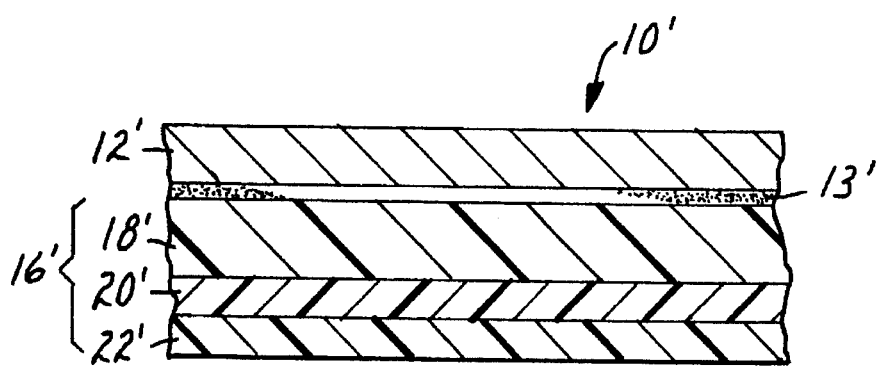
FIG. 2 is a schematic cross-section of a second embodiment of the innerseal facing.

FIG. 2 is a schematic cross-section of a second embodiment of innerseal facing 10'. Innerseal facing 10' is identical in structure to innerseal facing 10 shown in FIG. 1, but without heat sink layer 14 and adhesive layer 15. In summary, innerseal facing 10' includes an induction heatable layer 12' which is typically aluminum foil. Induction heatable layer 12' is adhesively connected by adhesive layer 13' to bonding layer 16'. Bonding layer 16' includes three strata shown in the drawing as 18', 20' and 22'.

Figure 3:
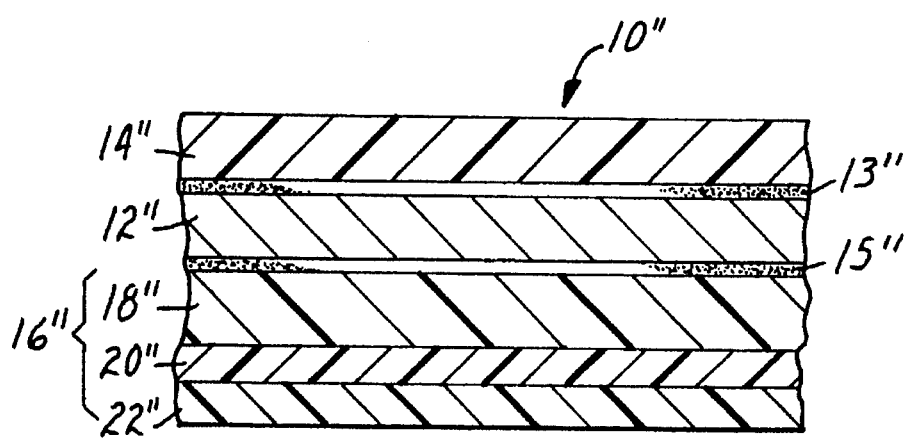
FIG. 3 is a schematic cross-section of a third embodiment of the innerseal facing.

FIG. 3 is a schematic cross-section of a third embodiment of innerseal facing material 10". Innerseal facing 10" includes three layers identical to those described with respect to innerseal facing 10, but heat sink layer 14" is disposed above induction heatable layer 12". The induction heater heats induction heatable layer 12", which directly heats bonding layer 16". Thus in the broadest sense of the invention, heat sink layer 14 can be disposed on either face of induction heatable layer 12, or excluded entirely, as generally illustrated by FIGS. 1 through 3.

Figure 4:
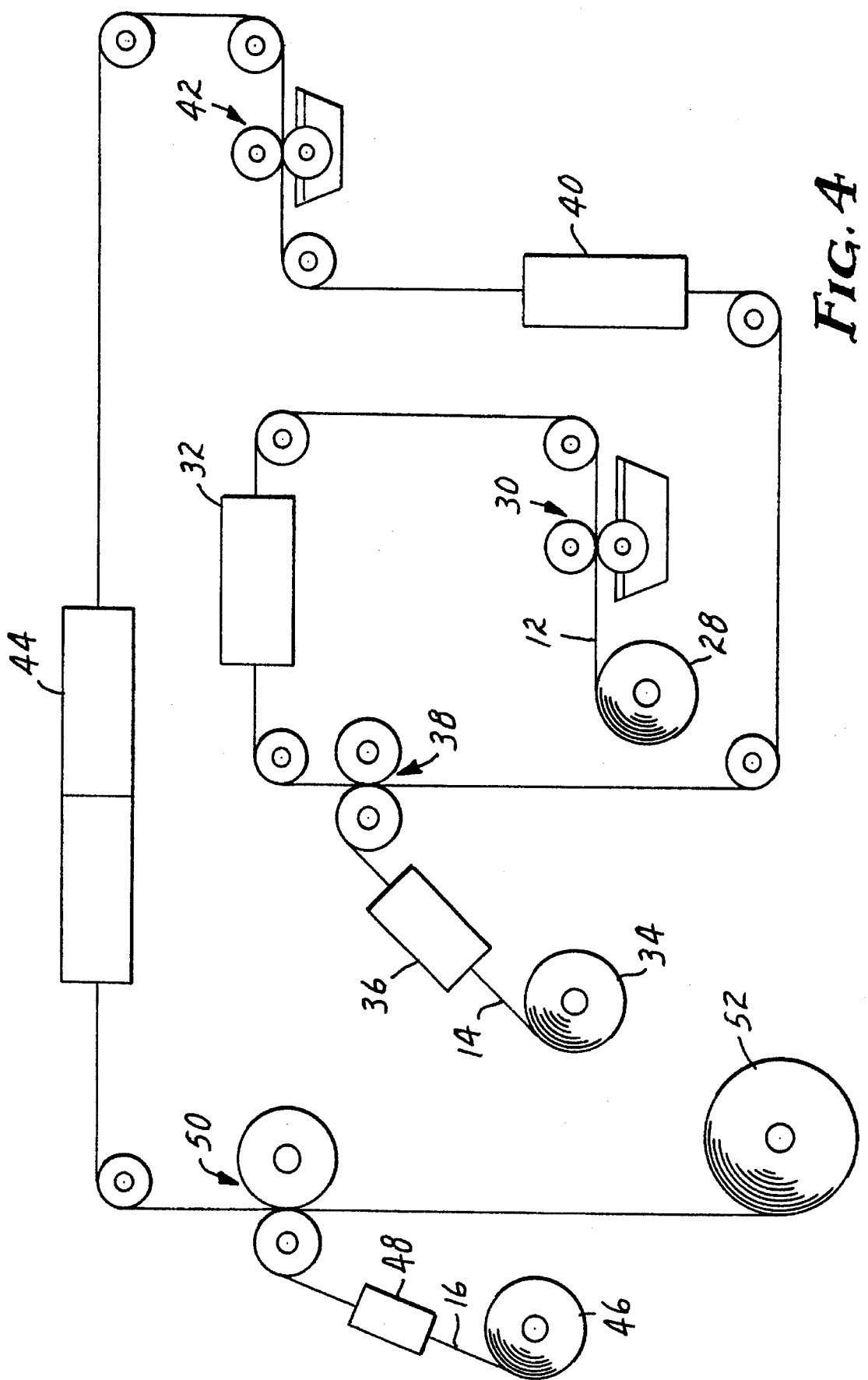
FIG. 4 is a schematic diagram for a process for making an illustrative embodiment of the innerseal facing.

FIG. 4 is a schematic diagram of an illustrative process for making innerseal facing 10. Induction heatable layer 12 is provided from a foil supply roll 28 at a rate of approximately 120 meters per minute. Induction heatable layer 12 is coated at an adhesive coating station 30 using an 85Q (quadrangular) gravure roll, and dried in an oven 32 operated at 115° C. to remove essentially all of the solvent. Heat sink layer 14 is provided from a supply roll 34 and may be treated in a corona discharge station 36. Corona discharge may be desirable to increase the surface energy of the preferred polyester material. The treated heat sink layer 14 is bonded to the induction heatable layer 12 in a nip 38 operated at approximately 6 bar nip pressure. The combined induction heatable layer and heat sink layer may be treated in corona discharge station 40 prior to the application of adhesive in adhesive coating station 42. These layers are dried in a two zone oven 44 to evaporate the solvent. The first, or entry zone of the oven is operated at 115° C., and the second, or exit zone of the oven is operated at 135° C.

Bonding layer 16 is provided by supply roll 46 and is preferably passed through a corona discharge station 48 to increase the surface energy of the high density polyethylene stratum to provide good adhesion with the Adcote-503A adhesive. The induction heatable layer and heat sink layer are combined with bonding layer 16 in laminating station 50. The lamination roll is operated at approximately 115° C., with a nip pressure of 6 bar. The completed innerseal facing 10 is wound up at winder station 52. The innerseal facing may also be provided with a tab to facilitate removal of the innerseal from the rim of the container to which it is applied. Tabs may be formed as described in U.S. Pat. Nos. 5,004,111 (McCarthy), 5,012,946 (McCarthy), and 4,934,544 (Han et al.). The illustrative process described above is intended to be exemplary rather than limiting, and wide variations in the processing parameters can be made without departing from the scope of the invention.

Figure 5:
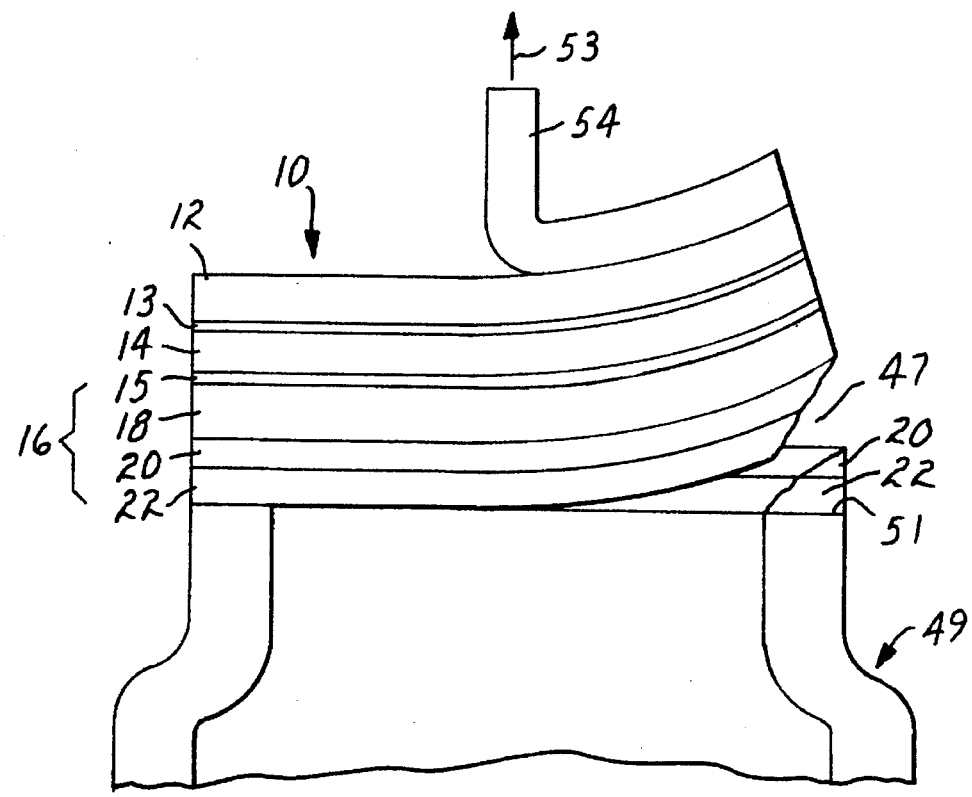
FIG. 5 is a schematic diagram of a top tabbed innerseal formed from the preferred facing showing the intended failure mode for the facing material during innerseal removal.

Innerseal facing 10 is adapted to bond to a container 49 in the manner illustrated in FIG. 5. Third stratum 22 of bonding layer 16 initially contacts rim 51 of container prior to sealing. When a first, or highest power level of an induction heater is applied, third stratum 22 and second stratum 20 melt, and first stratum 18 is bonded to rim 51 to seal the container. In order to remove innerseal 100, a user may grasp a top tab 54 and apply a first removal force in direction 53. Failure occurs in the area proximate first stratum 18, and is believed to be due to either delamination or fracture or both. First stratum 18 may either delaminate from heat sink layer 14 or second stratum 18, or it may fracture within first stratum 18, or both. Failure could also occur due to fracture across two or more strata. In either case, the bond between innerseal 100 and container 49 is broken, and innerseal 100 may be removed to expose the contents of the container.

Container 49 may also be sealed with a second, or intermediate power level of an induction heater. Third stratum 22 melts, and second stratum 20 is bonded to rim 51 to seal the container. First stratum 18 is generally unaffected, because the intermediate power level does not cause first stratum 18 to melt. When a user grasps tab 54 and applies a second removal force in direction 53, failure occurs in the area proximate second stratum 20, as shown generally in FIG. 5. Again, failure may be due to either delamination from the adjacent strata or due to fracture within second stratum 20. The second removal force is preferably less than the first removal force described above. It should be noted that the preferred bonding layer 16 is co-extruded with first stratum 18 and second stratum 20 formed from differing densities of essentially the same polymeric materials. Because the two strata comprise a similar material, the bond therebetween is comparatively strong, and delamination failure between these two strata becomes less likely.

A third, or lowest power level of an induction heater may instead be used to seal innerseal facing to rim 51 of container 49. Third stratum 22 bonds to rim 51 to seal the container, and first stratum 18 and second stratum 20 are generally unaffected, because the lowest power level does not cause these strata to melt. Thus when a user grasps top tab 54 and applies a third removal force in direction 53, failure occurs in the area proximate third stratum 20. As described above, failure may be due to either delamination from second stratum 20 or container rim 51, or due to fracture within third stratum 22. The third removal force is preferably less than the second removal force described above.

The three strata construction of bonding layer 16 presents an advantageous feature of the invention. When it is desirable to seal the container so that the innerseal facing is most effectively secured to the rim, the first, or highest power level of an induction heater may be applied to the innerseal facing. The first power level results in a seal that requires a first removal force to induce failure in the area proximate first stratum 18. When it is desirable to provide a seal that is more easily broken than the seal provided by the first power level, a second, or intermediate power level may be applied instead. The second power level will provide an intermediate strength seal, and will require that a second removal force, which is less than the first removal force, be applied to induce failure in the area proximate second stratum 20. If a seal that is easily broken is desired, a third power level may be selected instead. The innerseal facing may then be removed by a third removal force, which is less than the second removal force. In summary, the level of removal force may be controlled by using an innerseal facing according to the present invention, and by selecting an appropriate power level of an induction heater. Furthermore, the range of acceptable removal forces, from lowest to highest, is also greater than if a single stratum were used.

EXAMPLE ONE

Figure 6:
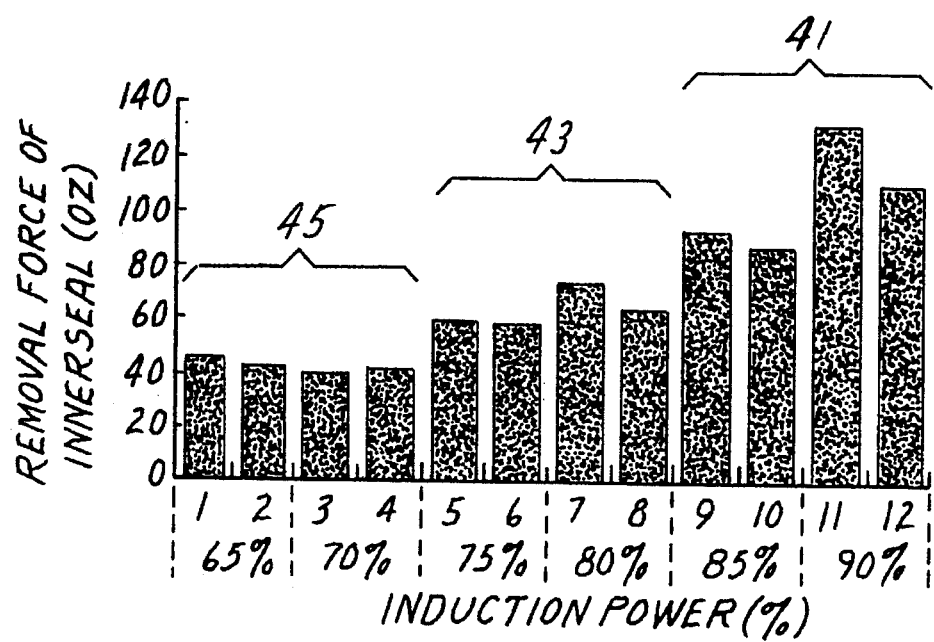
FIG. 6 is a chart showing removal force at various induction heating power levels.

Innerseal facing 10 made in accordance with the process described above was prepared for testing. Top tabs were applied to the innerseal facing 10 in accordance with the teaching of copending U.S. patent application Ser. No. 5,265,745 (Pereyra et al.), issued Nov. 30, 1993 and which is incorporated herein by reference. The top tabs, such as that shown in FIG. 5 at 54, were supplied to facilitate removal of the innerseal facing during the test. The completed innerseal facings were positioned within 38 mm threaded caps, which were screwed onto two 38 mm polyethylene bottles having a rim thickness of approximately 2 mm. The capped bottles were passed under an induction coil powered by a 2 kW induction heating machine manufactured by Enercon Industries Corporation, operated at various power levels extending from 65% power setting to 90% power setting. The bottles were passed under the induction coil on a conveyor moving at 12.2 m per minute. The innerseal facing removal force was determined by removing the caps and pulling the top tabs with an Instron Tensile Tester at a rate of 12.7 cm per minute. The pull was vertical with respect to the longitudinal axis of the bottle. The removal forces for a series of twelve sample groups are presented in FIG. 6, as a function of the induction heater power level applied.

The data shows a step-like function for removal force which is believed to result from progressive melting of the various strata of the bonding layer. Acceptable removal forces were achieved at all power settings, and no fuse-bonding occurred even at the highest power levels. At the third, or lowest power levels 45 (from 65% to 70% of full power) a third removal force was required to separate the bond between third stratum 22 and container 49. Third stratum 22 was essentially delaminated from the second stratum in the rim portion of the innerseal. A substantial portion of the third stratum remained bonded to the container rim.

At the second, or middle power level 43 (from 75% to 80% of full power), a second removal force was required to separate the bond between second stratum 20 and container 49. Removal of the innerseal induced a fracture type of failure.

At the first, or highest power level 41, first stratum 18 bonded to container 49. Removal of the innerseal induced a fracture type of failure.

The present invention has now been described with reference to several embodiments thereof. It will be apparent to those skilled in the art that many changes can be made in the embodiments described without departing from the scope of the invention. Hence, the scope of the present invention shall not be limited by the structures described herein, but only by structures described by the language of the claims and the equivalents of those structures.

I claim:

1. An innerseal facing for sealing to a container by an induction heater having at least three power levels, the innerseal facing comprising:
    (a) an induction heatable layer comprising metal foil;
    (b) a heat sink layer comprising polyester film bonded to said induction heatable layer for regulating heat flow; and
    (c) a bonding layer bonded to said heat sink layer and adapted for bonding to the container, said bonding layer including a plurality of polymeric strata, including in sequence from proximate said heat sink layer:
        (i) a first stratum comprising high density polyethylene having a first bonding temperature,
        (ii) a second stratum comprising low density polyethylene having a second bonding temperature lower than said first bonding temperature,
        (iii) a third stratum comprising an ionomer having a third bonding temperature lower than said second bonding temperature,
    wherein the application of inductive heat at a first power level heats said first stratum to said first bonding temperature and thereby bonds said innerseal facing to the container with a first removal force, and
    the application of inductive heat at a second power level less than said first power level heats said second stratum to said second bonding temperature and thereby bonds said innerseal facing to the container with a second removal force, and
    the application of inductive heat at a third power level less than said second power level heats said third stratum to said third bonding temperature and thereby bonds said innerseal facing to the container with a third removal force, and
    wherein said first removal force is greater than said second removal force, and said second removal force is greater than said third removal force.

2. The innerseal facing of claim 1 wherein said third removal force results from a failure proximate said third stratum.

3. The innerseal facing of claim 1 wherein said second removal force results from a failure proximate said second stratum.

4. The innerseal facing of claim 1 wherein said first removal force results from a failure proximate said first stratum.

5. An innerseal formed from the innerseal facing of claim 1, wherein said innerseal comprises a tab bonded thereto to enable removal of the innerseal from the container.

6. The innerseal facing of claim 1, wherein said second stratum and third stratum have approximately the same thickness, and together represent approximately 24% of the total thickness of said bonding layer.

7. A sealed container comprising:

(a) a container including a rim surrounding an opening; and (b) an innerseal bonded to said rim thereby sealing the opening, said innerseal comprising an innerseal facing including:

(i) an induction heatable layer; and (ii) a bonding layer coupled to said induction heatable layer, said bonding layer including a plurality of strata, wherein each adjacent strata has a progressively higher bonding temperature and wherein the stratum having the lowest bonding temperature is proximate said container and the stratum having the highest bonding temperature is proximate said induction heatable layer; and wherein application of progressively higher levels of inductive heat to said induction heatable layer imparts progressively higher bonding temperatures to said strata causing said strata to bond to said rim progressively from the stratum proximate said container to the stratum proximate said heat sealable layer, thereby bonding said innerseal to said rim with progressively higher removal forces;

wherein said bonding layer comprises a first stratum proximate said induction heatable layer, a second stratum proximate said first stratum, and a third stratum between said second stratum and said container, and wherein:

application of a first bonding temperature to said first stratum bonds said innerseal facing to said rim with a first bonding force, application of a second bonding temperature less than said first bonding temperature to said second stratum bonds said innerseal facing to said rim with a second bonding force less than said first bonding force, and application of a third bonding temperature less than said second bonding temperature to said third stratum bonds said innerseal facing to said rim with a third bonding force less than said second bonding force;

wherein said first stratum comprises high density polyethylene, said second stratum comprises low density polyethylene, and said third stratum comprises an ionomer.

8. A sealed container as in claim 7, wherein said innerseal facing further includes a heat sink layer.

9. The sealed container of claim 8, wherein said heat sink layer has a thickness of between approximately 0.5 mil and 2 mil.

10. The sealed container of claim 9, wherein said heat sink layer has a thickness of approximately 0.5 mil.

11. A sealed container as in claim 8, wherein said heat sink layer is between said induction heatable layer and said bonding layer.

12. A sealed container as in claim 11 wherein said heat sink layer comprises polyester.

* * * * *